United States Patent Office 2,834,678
Patented May 13, 1958

2,834,678

DIETARY SUPPLEMENT

William A. Hanson, Van Nuys, Calif.

No Drawing. Application November 16, 1953
Serial No. 392,491

5 Claims. (Cl. 99—11)

This invention relates to dietary supplements and has as its general object to provide an improved composition constituting an excellent source of certain vital food elements, in easily assimilable form. More specifically, the the invention aims to provide a dietary supplement constituting a source of food elements such as calcium, phosphoric acid, and inositol.

A further object is to provide such a dietary supplement in convenient form for use, such as tablet form.

Another object is to provide an improved process for manufacturing a dietary supplement of the class indicated above.

Toward the attainment of the foregoing generally stated objects, the invention contemplates a dietary supplement composition of phytates, phosphatides, and whole edible young animal bone.

Phytates are the metallic salts of phytic acid (inositol hexaphosphoric acid). In nature phytic acid occurs in whole grains primarily in the form of its mixed calcium, magnesium and potassium salt which is commonly known as phytin.

The invention specifically contemplates the production and utilization of phytin, which is a specific phytate containing varying amounts of calcium, magnesium and potassium. As a dietary supplement, phytin is valuable for the reason that it contains such dietary constituents as: calcium, phosphoric acid, magnesium and inositol. However, because of phytin's relatively high insolubility, these substances are not readily absorbed or assimilated by the body in the digestive process. In its natural state phytin is always associated with the enzyme phytase, a phosphatase which splits or hydrolizes the phytin so as to make it biologically available.

A major object of the invention is to combine a rich source of phosphatase enzymes with phytin or other phytates in order that hydrolysis may occur in the digestive tract and the dietary constituents listed above may be easily assimilated.

Animal bone, which is one of the substances the use of which is contemplated by the invention, is not ordinarily effective to any satisfactory extent as a source of phosphatase, for a number of reasons which will be stated more fully hereinafter. A particular object of the invention is to provide an improved dietary supplement containing bone meal in an improved form in which it does provide a very substantial dietary benefit, and to provide an improved method of obtaining this improved form of bone meal.

The foregoing general objectives, and other objects, and how they are attained, will be explained and exemplified in the following detailed description of the invention and how it is practiced.

As previously indicated, the invention contemplates the use of phytin, a derivative of phytic acid, as a source of vital elements such as calcium, magnesium, etc.

The structural formula of phytic acid is depicted below:

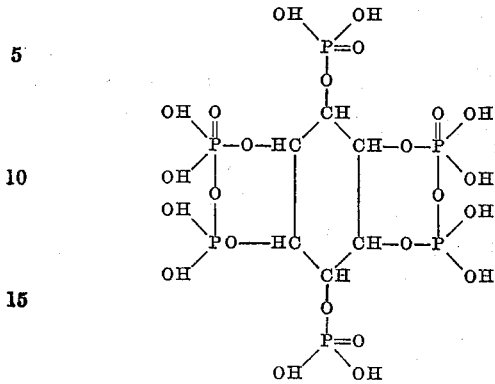

From this formula it can be seen that phytic acid is built up by the addition of 6 molecules of phosphoric acid to an inositol nucleus. Inositol, chemically known as cyclohexanehexol is a vitamin of recognized importance particularly in the metabolism of fats. To produce phytin the acid hydrogens of the phytic acid molecule are replaced by varying amounts of calcium, magnesium and potassium. Phytin which is available commercially contains a minimum of 20% calcium, 19% total phosphorous, 2% magnesium, .2% total nitrogen and traces of potassium.

The commercial phytin is prepared as a by-product in the manufacture of glucose by the hydrolysis of corn with sulphuric acid. The residue, after the removal and purification of the glucose is known as corn steep water, and contains phytic acid which is removed and purified as the calcium salt practically identical with naturally occuring phytin.

Other phytates may be prepared by acidifying phytin to phytic acid and then combining with other metallic salts such as copper chloride. The result is a modified phytate, enriched by the presence of added vital elements.

It can be readily seen that phytin contains valuable dietary constituents: calcium, phosphoric acid, magnesium and inositol. However, because of phytin's relatively high insolubility, these substances are not readily absorbed or assimilated by the body in the digestive process. In its natural state phytin is always associated with the enzyme phytase, a phosphatase which splits or hydrolyzes the phytin so as to make it biologically available.

The source of phosphatase enzymes used in this invention is animal bone prepared fresh and without exposure to heat of a nature which will destroy the enzyme activity. This bone should be from inspected animals and handled as edible material.

Ordinary bone meal is ineffective as a source of phosphatase for three reasons; (1) it is bone from adult animals and not as high in phosphatase as bone from young animals, (2) it is purified to a point where enzyme and protein constituents are removed or destroyed, and (3) it is steam cleaned and the heat involved destroys all enzymatic activity.

Bone powder prepared by my method involves the freezing of fresh young veal bone (from calves four to eight months old) and grinding in the frozen stage in a suitable grinder such as a hammer mill or a Fitzpatrick attrition mill. The bones are first chopped in a rough-grinding or comminuting step. This may be done in an ordinary meat grinder (before or after freezing) to reduce them to a size convenient for the finer grinder. The ground bone (30 mesh) may be mixed with Dry Ice to facilitate the grinding operation inasmuch as the fresh bone is very elastic and when the temperature is thus reduced the elasticity is decreased and grinding is made easier.

The finely ground material (bone powder) is then dried at body temperature. Chloroform or some suitable volatile solvent may be added to retard decomposition during drying. Alternative methods of drying may be used. Thus the ground material may be dried at 37° C. in a vacuum pan or it may be mixed with a suitable carrier to absorb the fats (extracted wheat germ is preferred) and the mixture can then be dried by a blast of dry air (30% relative humidity or less) which is filtered to reduce bacterial content. The temperature of the incoming air should not exceed 130° to 150° F. so that the material itself is not heated over 37° C. for any length of time.

The dried bone powder is treated with chloroform to destroy possible insect eggs and to act as a preservative during storage and handling. It should if possible be kept in cold storage to preserve the enzyme potency.

Suitable anti-oxidants such as alpha-tocopherol (vitamin E) may be added to retard or prevent rancidity, as the final product is high in fatty material. This is desirable but not necessary.

Animal bone powder prepared in this manner is one of the cheapest and most convenient sources of biologically active phosphatase enzymes. In addition it is of high nutritional value for it contains calcium and phosphorous (11% and 6% respectively), trace elements, marrow and fat.

The usefulness as a dietary supplement of the above described composition comprising phytin, or other phytates, and the specially prepared whole bone powder may be further enhanced by the addition of substances which are generically known as phosphatides. Phosphatides are a group of substances which are combinations of various organic radicals with glycero-phosphoric acid. The more commonly known phosphatides are lecithin and cephalin.

These phosphatides are well known in the art and are prepared principally from soy beans for use as emulsifying agents in baking etc., and as shortening extenders. They are available either in fluid form or in a more purified dry powder.

Phosphatides are excellent sources of phosphorous choline and several of the essential fatty acids. Here again the phosphatase enzymes contained in the whole bone powder aid in the bodily assimilation of the phosphatides in that they act to hydrolyze the phosphatide into its constituent parts.

Tablet making with any substantial amount of the whole bone powder mentioned above is a very difficult process. None of the known binders or gums have proven satisfactory where the amount of bone powder in the tablet exceeds 30%. Even smaller amounts of whole bone powder cause difficulty. This is due to the fact that the whole bone is used without discarding any of the material during grinding, and it contains peculiarly elastic fragments of connective tissue and integuments. In addition to these elastic integuments the high fat content introduced into the tablet granulation by any significant amount of the specially prepared bone powder makes tablet pressing most difficult.

In my method these difficulties have been overcome by the combination of phytin with the bone flour. The phytin has a peculiar binding property when the moisture content of the mixture exceeds 4%. Any significant amount of phytin added to the bone flour improves the tablet making properties, but the most satisfactory results have been obtained with a ratio of five parts of bone flour to three and one half parts of phytin. More phytin produces a still harder tablet. In fact it is possible to exceed the optimum hardness by increasing the phytin beyond the ratio of one to one and produce tablets too hard for proper disintegration in the alimentary tract. The invention contemplates a ratio of phytates to bone powder which may range between .4:1 and 1:1 with a .7:1 ratio as the optimum.

Tablets comprising whole bone powder, phytin or other phytates and a phosphatide; or whole bone powder with either of the other two ingredients alone may be made by simply slugging into granulation and re-running through the tablet press according to the standard practice of the art known as "dry granulation." A more satisfactory method is the dampening of the mixture and drying to a moisture content of 5 to 10% at a temperature below 105° F. In the tablet making art this is known as a "wet granulation." The addition of a half to one percent of a sugar such as sucrose or glucose improves the mixture, but this is not necessary to the production of satisfactory tablets.

The following example should serve to illustrate the tablet making process: 50 parts of whole bone powder and 35 parts phytin are wet granulated by mixing with about 50 parts of water saturated with chloroform. The mixture is extruded into strings, dried in air at 100° F. or under an inert gas (such as $CO_2$) to a moisture content of about 5 to 10% and ground to granulation size in a suitable grinder. To this wet granulation may be added 15 parts of other ingredients if desired, such as lecithin, rose hip powder, brewer's yeast or cephalin. The material is then fed into a standard tablet press to make tablets. From one half to one part sucrose may be added to improve the tablet and a suitable lubricant such as talc (one half to one part) may be added as is customary in the art.

The following formulations are given as examples of successful combinations of the substances comprising my invention in tablet form:

I 50 parts dried veal bone powder;
35 parts phytin;
10 parts rose hip flour;
5 parts dry lecithin powder;
Lubricants as necessary.

II 50 parts dried veal bone powder;
30 parts phytin;
5 parts copper phytate;
10 parts rose hip flour;
5 parts dry lecithin powder.

III 50 parts dried veal bone powder;
15 parts phytin;
20 parts iron phytate;
15 parts brewers' yeast.

IV 60 parts dried veal bone powder;
40 parts phytin.

V 50 parts dried veal bone powder;
35 parts phytin;
10 parts yeast extract;
5 parts cephalin.

The dryness of the bone powder in each instance is equivalent to that obtained by vacuum drying.

In summarizing it should be noted that the combination of veal bone and phytin is a new and useful combination for the following reasons:

(1) The phytin is the only successful binder that has been found to make possible the production of suitable tablets with a significant precentage of this type of specially prepared whole bone powder.

(2) The phosphatase enzymes supplied by the specially prepared whole veal bone powder assists in the utilization and assimilation of the phytin by a partial hydrolysis releasing calcium, phosphoric acid and inositol, or in the case of other phytates, the metallic elements such as iron or copper which may replace the calcium.

(3) The calcium and phosphorus content of the phytin is an additional benefit to the calcium and phosphorous of the specially prepared whole bone. (This specially prepared whole veal bone has about 11% calcium and 6% phosphorus. Conventional bone meal contains about 35% calcium and 17% phosphorus but lacks the enzymes, fat and protein of this specially prepared veal bone. Therefore the 20% calcium and 19% phosphorus of the phytin adds to the calcium-phosphorus content of this combination and still the enzymes and proteins of the whole bone are available.)

(4) The magnesium ion is necessary to the activity of the animal bone phosphatase enzymes and phytin supplies magnesium (2% of the phytin).

The combination of the animal bone and a phosphatide such as lecithin is new and useful for the following reasons:

(1) The emulsifying ability of lecithin improves the absorption of the fatty elements of the specially prepared whole bone.

(2) The phosphatase enzymes of the whole bone are active in hydrolyzing the glycerophosphate radical of phosphatide, thus increasing the biological availability of the hydrolysis products: phosphoric acid, essential fatty acids and choline.

The distinction between the whole veal bone powder utilized by my invention and conventional bone meal, is hereinafter defined by the modifying phrase "enzymatically active," which is used to designate the enzyme content of the bone powder, prepared under refrigeration so as to avoid any substantial loss of enzymes, and which is thus quite different from ordinary bone meal.

I claim:

1. A dietary supplement composition, the essential components of which consist of: enzymatically active powdered whole edible veal bone having a phosphatase enzyme content substantially corresponding to that of the original unprocessed bone; the mixed calcium and magnesium salt of inositol hexaphosphoric acid, commonly known as phytin; and a moisture content approximately within the range of 4% to 10%; wherein said phosphatase enzyme of said powdered bone provides for bodily assimilation of the phytin during the digestive process in that it acts to hydrolyze said phytin and to thereby release free inositol, phosphoric acid and calcium and magnesium ions and to inhibit deleterious decalcifying action of the phytin per se; said powdered bone and phytin being intermixed and bonded together in a hard coherent tablet in which the phytin, functioning as a binder, provides the coherence of the mixture; the proportion of phytin to bone powder being substantially within the range of 4:10 and 7:10.

2. The composition defined in claim 1, wherein the said proportion is an optimum of approximately 7:10.

3. A dietary supplement composition, the essential components of which consist of: enzymatically active powdered whole edible young animal bone having a phosphatase enzyme content substantially corresponding to that of the original unprocessed bone; the mixed calcium and magnesium salt of inositol hexaphosphoric acid, commonly known as phytin; and moisture not exceeding 10%; wherein said phosphatase enzyme of said powdered bone activates the bodily assimilation of the phytin during the digestive process in that it acts to hydrolyze said phytin and to thereby release free inositol, phosphoric acid and calcium and magnesium ions and to inhibit deleterious decalcifying action of the phytin per se; said powdered bone and phytin being intermixed and bonded together in a hard coherent tablet in which the phytin, functioning as a binder, provides the coherence of the mixture; the proportion of phytin to bone powder being substantially within the range of 4:10 and 7:10.

4. A dietary supplement composition, the essential components of which consist of: enzymatically active powdered whole edible veal bone having a phosphatase enzyme content substantially corresponding to that of the original unprocessed bone; the mixed calcium, phosphorous and magnesium salt of inositol hexaphosphoric acid, commonly known as phytin; and a moisture content not greater than 10%; wherein said phosphatase enzyme of said powdered bone activates the bodily assimilation of the phytin during the digestive process in that it acts to hydrolyze said phytin and to thereby release free inositol, phosphoric acid and calcium and magnesium ions and to inhibit deleterious decalcifying action of the phytin per se; said powdered bone and phytin being intermixed and bonded together in a hard coherent tablet in which the phytin, functioning as a binder, provides the coherence of the mixture; the proportion of phytin to bone powder being approximately 7:10.

5. A dietary supplement composition, the essential components of which consist of: enzymatically active powdered whole edible young animal bone having a phosphatase enzyme content substantially corresponding to that of the original unprocessed bone; the mixed calcium, phosphorus and magnesium salt of inositol hexaphosphoric acid, commonly known as phytin; a phytate selected from the group including copper and iron phytates; and a moisture content approximately within the range of 4% to 10%; wherein said phosphatase enzyme of said powdered bone activates the bodily assimilation of the phytin during the digestive process in that it acts to hydrolyze said phytin and to thereby release free inositol, phosphoric acid and calcium and magnesium ions; said powdered bone and phytin being intermixed and bonded together in a hard coherent tablet in which the phytin, functioning as a binder, provides the coherence of the mixture; the proportion of phytin to bone powder being approximately 6:10 and the proportion of said phytate to bone powder being approximately 1:10.

References Cited in the file of this patent

UNITED STATES PATENTS

| 136,678 | Tamin | Mar. 11, 1873 |
| 2,239,543 | Andrews | Apr. 22, 1941 |
| 2,310,383 | Andrews | Feb. 9, 1943 |
| 2,619,420 | Jukes | Nov. 25, 1952 |

OTHER REFERENCES

Tauber: Chemistry and Technology of Enzymes, 1949, John Wiley & Sons, Baltimore, pages 32–36.

Sumner et al.: The Enzymes, vol. 1, part 1, 1950, Academic Press, New York, pages 504–510.

"Calci Vita," Trademark 314,196, registered June 19, 1934, by William Verne Bond, Chicago, Illinois.